Patented Aug. 6, 1946

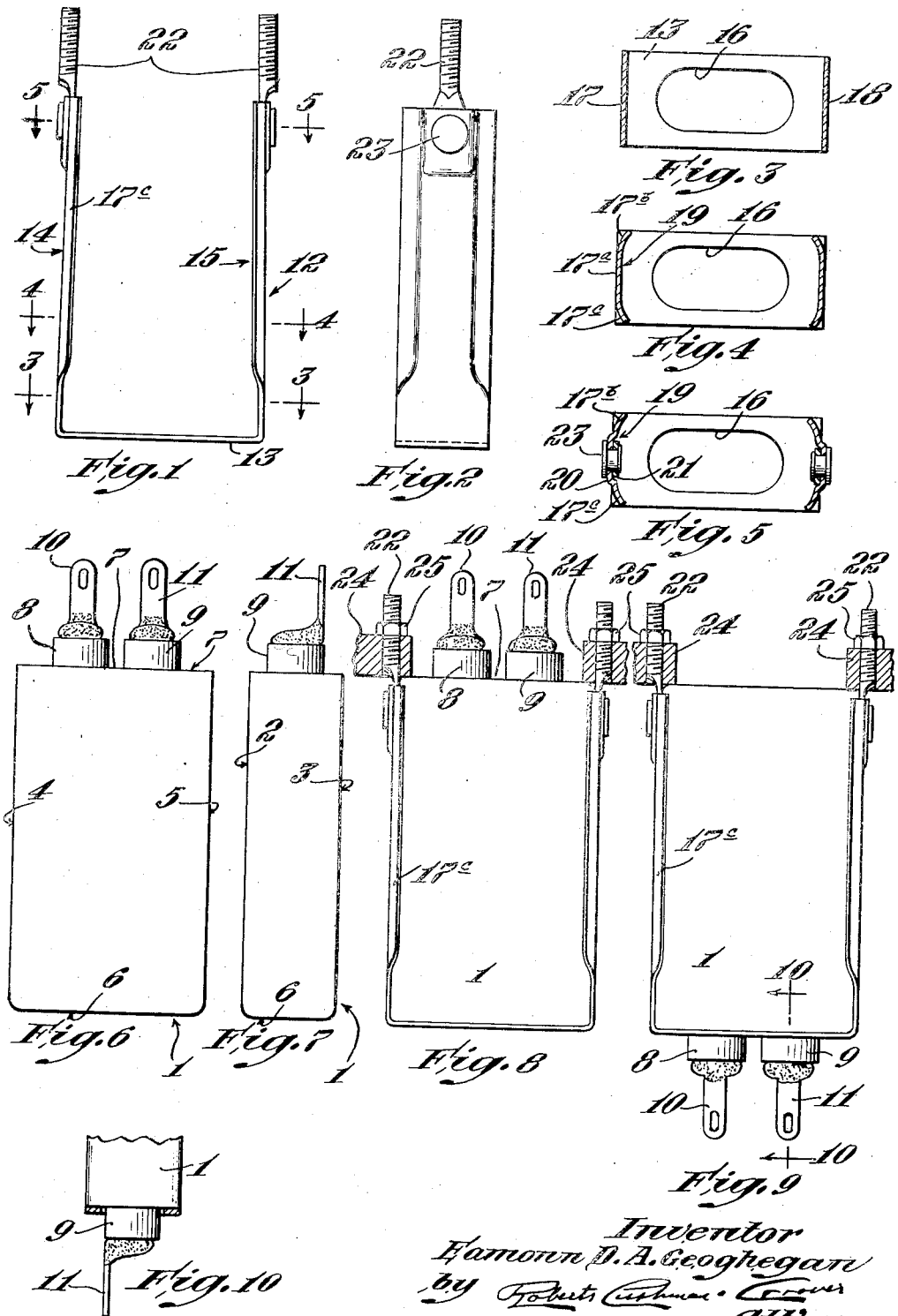

2,405,139

UNITED STATES PATENT OFFICE 2,405,139

SUPPORT FOR CAPACITORS

Eamonn D. A. Geoghegan, Canton, Mass., assignor to Tobe Deutschmann Corporation, Canton, Mass., a corporation of Delaware Application November 23, 1944, Serial No. 564,849

3 Claims. (Cl. 248—311)

This invention relates to supports and more particularly to a supporting bracket for an electrical capacitor or similar device. One well known type of electrical capacitor comprises a generally rectangular box or case customarily of sheet metal or other strong rigid material. In certain types, this box or case is wider in a direction parallel to the planes of the condenser plates (which are enclosed within it) than in a direction perpendicular to said planes so that the box has relatively narrow edges. From one end of the box or case project two insulating plugs symmetrically disposed with respect to said end, and extending outwardly from each plug is an elongate metallic terminal or connector. The terminals are disposed in a plane which is substantially tangent to both insulating plugs. The box or case is smooth and hard, its corners and edges are smoothly rounded and it has no projections other than the two insulating plugs and the terminals carried thereby. Since such capacitors are often used in places where they are subjected to constant vibration, as for instance in vehicles, and since it is desirable in some instances to have the terminals of the capacitor extend in one direction and in some instances to have them extend in the opposite direction, it is not easy to mount such capacitors at the desired point of use so as with certainty to prevent them from moving or rattling. The principal object of the present invention is to provide a very simple and reliable support for such capacitors whereby they may be mounted in the desired position of use with no danger that they will escape or rattle during use, and permissively in either of two selected positions wherein respectively the terminals extend in opposite directions, the support being of such design that the capacitor may be introduced and removed without recourse to the use of special tools or the exercise of any particular skill. Other and further objects and advantages of the invention will be pointed out in the following more detailed description and by reference to the accompanying drawing wherein Fig. 1 is a front elevation of the supporting bracket in accordance with the present invention;

Fig. 2 is a side elevation of the bracket;

Fig. 3 is a section on the line 3—3 of Fig. 1;

Fig. 4 is a section through the bracket on the line 4—4 of Fig. 1;

Fig. 5 is a section through the bracket on the line 5—5 of Fig. 1;

Fig. 6 is a front elevation of a capacitor of the type which the novel bracket is designed to hold;

Fig. 7 is an edge elevation of the capacitor;

Fig. 8 is a front elevation of the bracket of the present invention showing the capacitor mounted therein with its terminals directed upwardly;

Fig. 9 is a similar view showing the capacitor with its terminals directed downwardly; and Fig. 10 is a fragmentary section on the line 10—10 of Fig. 9.

Referring to the drawing (Fig. 6 and 7) the numeral 1 designates an electrical capacitor of a type which the improved support is particularly designed to hold. This capacitor comprises the opposite wide faces 2 and 3 (Fig. 7) and the opposite relatively narrow faces 4 and 5 (Fig. 6). It has the bottom wall 6 and the top wall 7 from which project the insulating plugs 8 and 9. These plugs are located symmetrically (Fig. 7) with respect to the top wall 7 of the capacitor and from each plug extends a metallic terminal or connector 10 and 11 respectively. As shown in Fig. 7 these terminals 10 and 11 are disposed in a plane which is substantially tangent to both plugs 8 and 9, the plane of these terminals 10 and 11 (as shown) being nearer to the wall 3 of the capacitor than to the opposite wall 2. The walls 2 and 3 are parallel to the planes of the condenser plates (not shown) enclosed within the casing of the capacitor. This casing is usually of sheet metal and has a smooth, hard outer surface and its edges and corners are smoothly rounded.

The bracket 12 (Figs. 1 to 5) in accordance with the present invention, is preferably made from a strip or ribbon of stiffly resilient sheet metal, for example steel. This length of ribbon is bent so as to form the substantially flat rectangular bottom member 13 (Fig. 3) and the substantially parallel legs 14 and 15 (Fig. 1), the bracket thus being of general U-shape. At their lower portions the legs 14 and 15 are substantially flat and rectangular in transverse section, as shown at 17 and 18 (Fig. 3). These lower parts of the legs are integrally joined to the end member 13 and preferably incline toward each other to a slight degree when the bracket is empty. Above these lower rectangular portions, the legs have a longitudinally extending substantially flat central portion 17$^a$ (Fig. 4) and marginal flanges 17$^b$ and 17$^c$ so as to provide a longitudinal channel 19 at the inner side of the leg. The legs are thus more or less concave at their inner surfaces, the concavities or channels of the two legs being opposed to each other. Near their free upper ends the legs 14 and 15 are struck outwardly at 20 to form recesses for the reception of the lower flat ends 21 of posts 22 which are secured to the legs by rivets 23. The upper parts of these posts are screw threaded. These posts are designed to pass through slots in rigid supports 24 and to receive nuts 25 by means of which the posts are attached to the supports 24.

The legs 14 and 15 are so spaced that when the capacitor is slid downwardly between them, the upper ends of the legs are forced apart slightly so that when the capacitor is seated in the bracket the legs resiliently grip the capacitor between them. Since the narrow edges of the capacitor are disposed in the channels 19, the capacitor cannot escape from the bracket in a front or rear direction, and as its lower end rests upon the end member 13 of the bracket, the capacitor is very securely held in position so that it cannot drop from the bracket or rattle when subjected to vibration.

The end member 13 (Fig. 3) of the bracket is furnished with an elongate symmetrically disposed slot 16 of a width slightly greater than the diameter of one of the insulating plugs 8 of the capacitor. Thus, if desired, the capacitor may be disposed in the bracket as shown in Figs. 9 and 10 with the insulating plugs 8 and 9 projecting directly through the slot 16 and with the terminals 10 and 11 exposed below the bracket. Since the slot 16 is symmetrical, it is possible to dispose the inverted capacitor in the bracket with the plane of the terminals 10 and 11 nearer to the front or alternatively nearer to the rear of the bracket, as may be desired.

While one desirable embodiment of the invention has been shown by way of example it is to be understood that the invention is broadly inclusive of any and all modifications falling within the scope of the appended claims.

I claim:

1. A supporting bracket for an electrical capacitor, said bracket being of substantially U-shape and having substantially parallel legs designed to receive the capacitor between them, the opposed surfaces of the legs being concave for clampingly engaging the capacitor and spaced to permit the capacitor to be slidingly inserted between them from the open end of the bracket, and means at the free end of each leg for attaching it to a support, said attaching means leaving said concave surfaces unobstructed for said sliding insertion.

2. A supporting bracket for an electrical capacitor, said bracket being of substantially U-shape, comprising an end member and a pair of substantially parallel legs integral with the end member, each leg having a longitudinal channel designed to receive one edge of the capacitor, each leg having a threaded post at its free end for connecting the bracket to a support, said threaded posts being on the outside of said channels for ready reception of said edges.

3. A supporting bracket for an electrical capacitor, said bracket being substantially U-shape and comprising a strip of substantially resilient sheet metal bent to provide a substantially flat rectangular end member and a pair of parallel legs, the opposed faces of the legs being shaped to engage opposite edges of the capacitor and resiliently to grip the latter between them, the end member having a symmetrically disposed slot operative to permit passage of the terminals of the capacitor, and means at the opposite end of each leg for attaching it to a support.

EAMONN D. A. GEOGHEGAN.